(12) United States Patent
Parekh et al.

(10) Patent No.: US 10,216,335 B1
(45) Date of Patent: Feb. 26, 2019

(54) REDUCING FALSE SENSING OF TOUCHSCREEN INPUTS

(71) Applicant: GOOGLE LLC, Mountain View, CA (US)

(72) Inventors: Premal Parekh, Milpitas, CA (US); Amy Lai Wong, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/787,424

(22) Filed: Oct. 18, 2017

Related U.S. Application Data (60) Provisional application No. 62/409,614, filed on Oct. 18, 2016.

(51) Int. Cl.
*G06F 3/041* (2006.01)
*G06F 3/045* (2006.01)
*G06F 3/044* (2006.01)

(52) U.S. Cl.
CPC .......... *G06F 3/0418* (2013.01); *G06F 3/0412* (2013.01); *G06F 3/044* (2013.01); *G06F 3/045* (2013.01)

(58) Field of Classification Search
None
See application file for complete search history.

(56) References Cited

U.S. PATENT DOCUMENTS

| | | | | |
|---|---|---|---|---|
| 9,201,461 B2* | 12/2015 | Hotelling | .............. | G06F 1/1658 |
| 2011/0291939 A1* | 12/2011 | Tsukahara | ............. | G06F 3/0202 345/168 |
| 2014/0210784 A1* | 7/2014 | Gourevitch | .......... | H03K 17/962 345/174 |
| 2014/0293163 A1* | 10/2014 | Ju | ........................... | G06F 3/044 349/12 |
| 2014/0320199 A1 | 10/2014 | Trend et al. | | |
| 2014/0333555 A1* | 11/2014 | Oh | ......................... | G06F 3/044 345/173 |
| 2014/0362036 A1* | 12/2014 | Mo | ........................ | G06F 3/044 345/174 |
| 2015/0268765 A1* | 9/2015 | Nakayama | ............ | G06F 3/0412 345/174 |
| 2016/0216796 A1 | 7/2016 | Johansson et al. | | |
| 2016/0357327 A1* | 12/2016 | Chang | ................... | G06F 3/0418 |

* cited by examiner

*Primary Examiner* — Kenneth B Lee, Jr.
(74) *Attorney, Agent, or Firm* — Brake Hughes Bellermann LLP (57) ABSTRACT

An apparatus can comprise a display, a first plurality of electrodes, a second plurality of electrodes, a dummy electrode, and a processor. The processor can cause the apparatus to recognize a contact in response to receiving input on at least one of the first plurality of electrodes and at least one of the second plurality of electrodes and receiving no input on the dummy electrode, and ignore a contact in response to receiving input on the dummy electrode, at least one of the first plurality of electrodes, and at least one of the second plurality of electrodes.

20 Claims, 8 Drawing Sheets

REDUCING FALSE SENSING OF TOUCHSCREEN INPUTS

PRIORITY CLAIM

This Application claims priority to provisional application No. 62/409,614, filed on Oct. 18, 2016, entitled, "Methods and Apparatus to Reduce False Sensing of Touch Screen Inputs," the disclosure of which is hereby incorporated by reference.

BACKGROUND

Touchscreens can include electrodes extending from a touch controller. The electrodes can detect contacts from a user, and can determine a location of a contact based on which electrodes detected the contact. Contacts can extend outside of a display area that is designed to receive input. Outside of the display area, the electrodes can be bunched close together before being routed onto a flexible printed circuit board that couples the electrodes to the touch controller. The proximity of the contacts to each other outside the display area can cause contacts just outside the display area to activate a combination of electrodes that causes the touchscreen to falsely detect a touch at an incorrect location on the display area of the touchscreen.

SUMMARY

To reduce false and/or incorrect detection of inputs on a touchscreen, dummy electrodes can extend from a touch controller to locations where contacts should not be detected. If a dummy electrode detects a contact, then no contact will be detected and/or recognized by the touchscreen.

In a general aspect, a falsely sensed input of a touchscreen is ignored when an input is also sensed on a false-sense line located in a border region of the touchscreen, wherein the false-sense line is not a touch sense line of the touchscreen.

In another general aspect, an example touchscreen apparatus includes a first sensor in a border region of a touchscreen, a second sensor located in the touchscreen, and a controller configured to, when an input is sensed by the first sensor, ignore an input sensed by the second sensor.

In another general aspect, an apparatus can comprise a display, a first plurality of electrodes, a second plurality of electrodes, a dummy electrode, and a processor. The display can include a translucent interior cover portion and an opaque outer cover portion. The first plurality of electrodes can extend under a first portion of the opaque outer cover portion and under the translucent interior cover portion. The second plurality of electrodes can extend under a second portion of the opaque outer cover portion and under the translucent interior cover portion. The second portion of the opaque outer cover portion can be non-overlapping with the first portion of the opaque outer cover portion. The second plurality of electrodes can intersect the first plurality of electrodes under the translucent interior cover portion. The dummy electrode can be disposed under a third portion of the opaque outer cover portion. The third portion of the opaque outer cover portion can be disposed between the first portion of the opaque outer cover portion and the second portion of the opaque outer cover portion. The processor can be configured to cause the apparatus to process a contact in response to receiving input on at least one of the first plurality of electrodes and receiving input on at least one of the second plurality of electrodes and receiving no input on the dummy electrode, and ignore a contact in response to receiving input on the dummy electrode, at least one of the first plurality of electrodes, and at least one of the second plurality of electrodes.

In another general aspect, an apparatus can comprise a display, a first plurality of electrodes, a second plurality of electrodes, a dummy electrode, and a processor. The display can include a translucent interior cover portion and an opaque outer cover portion. The first plurality of electrodes can extend under a first portion of the opaque outer cover portion and under the translucent interior cover portion. The second plurality of electrodes can extend under a second portion of the opaque outer cover portion and under the translucent interior cover portion, the second portion of the opaque outer cover portion being non-overlapping with the first portion of the opaque outer cover portion, the second plurality of electrodes intersecting the first plurality of electrodes under the translucent interior cover portion. The dummy electrode can be disposed between two of the first plurality of electrodes. The processor can be configured to cause the apparatus to recognize a contact in response to receiving input on at least one of the first plurality of electrodes and at least one of the second plurality of electrodes and receiving no input on the dummy electrode, and ignore a contact in response to receiving input on the dummy electrode, at least one of the first plurality of electrodes, and at least one of the second plurality of electrodes.

In another general aspect, a non-transitory computer-readable storage medium can comprise instructions stored thereon for determining whether contacts are in an active part of a display. The instructions, when executed by at least one processor, can be configured to cause a computing system to process a contact in response to receiving input on at least one of a first plurality of electrodes and at least one of a second plurality of electrodes and receiving no input on a dummy electrode, the first plurality of electrodes intersecting the second plurality of electrodes and the dummy electrode being adjacent to the first plurality of electrodes, and ignore a contact in response to receiving input on the dummy electrode, at least one of the first plurality of electrodes, and at least one of the second plurality of electrodes.

DETAILED DESCRIPTION

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Figure 1:
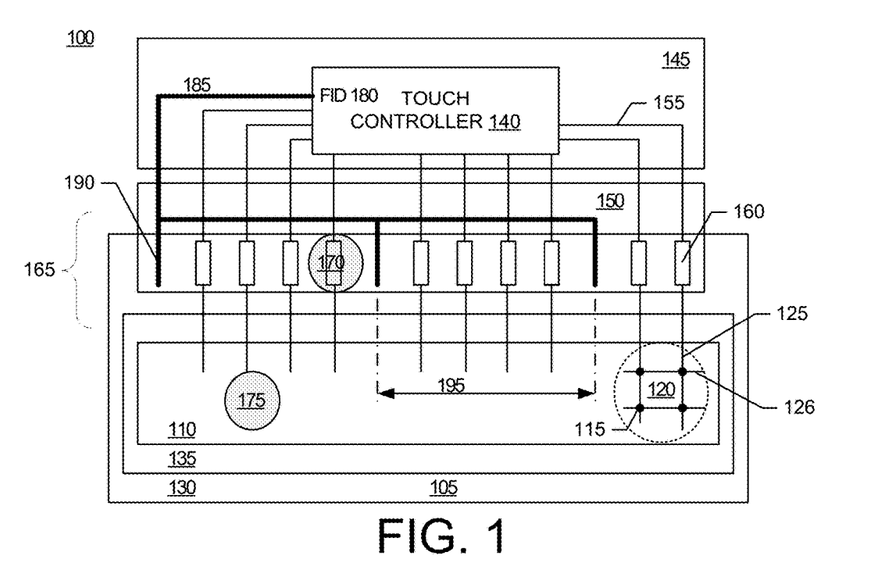
FIG. 1 is a block diagram of an example touchscreen apparatus to reduce false sensing of touchscreen inputs.

FIG. 1 is a block diagram of an example touchscreen apparatus 100 that reduces false sensing of touchscreen inputs. The touchscreen apparatus 100 includes any type of touchscreen 105. Example touchscreens include a capacitive touchscreen or a resistive touchscreen. Touchscreens can support detection and discrimination of one or more simultaneous touches on the touchscreen surface. Touchscreens can detect inputs that correspond to a user's finger or a stylus, as non-limiting examples, being in close proximity to, but not actually touching, the screen and/or inputs that correspond to a user's finger or a stylus, being in contact with the screen. The example touchscreen 105 of FIG. 1 includes a display area 110 having any number and/or type(s) of display elements (e.g., liquid crystal display (LCD) and/or light emitting diode (LED)), one of which is designated at reference numeral 115. The display area 110 includes a grid (a portion of which is designated at reference numeral 120) of sensing lines or traces (two of which are designated at reference numerals 125 and 126). For clarity of understanding, only a portion of the large number of sensing lines (vertical and horizontal) and display elements that make up a typical touchscreen are shown. As shown in FIG. 1, intersections of the sensing lines 125, 126 may coincide with the display elements 115, but they may be arranged otherwise.

The example touchscreen 105 includes a substrate or base 130 (e.g., plastic or glass) for the display area 110. The sensing lines 125, 126 are routed to the display area 110 in an area 135 or region around the display area 110. Lines (not shown) driving the display elements 115 are also routed in the area 135, but may be routed elsewhere.

To control the touchscreen apparatus 100, the example apparatus 100 of FIG. 1 includes a touch controller 140 disposed on a printed circuit board (PCB) 145. The PCB 145 is electrically coupled to the touchscreen 105 via a flexible or flex PCB 150. Lines or traces on the PCB (one of which is designated at reference numeral 155) are electrically coupled to a respective line (e.g., the line 125) on the touchscreen 105 via mated pairs of bonding pads (one pair of which is designated at reference numeral 160). Lines on the touchscreen 105 (e.g., the line 125) are routed from their respective bonding pad (e.g., the pad pair 160) to the display area 110. In the example of FIG. 1, the PCBs 145, 150 are shown exaggerated in size. Typically, the lines 125, 126 have to be fanned out as they are routed from the bonding pads 160 to the extents of the display area 110.

In some examples, some of the lines 125, 126 may be susceptible to spurious inputs in an area or region 165 around the bond pads 160. Susceptibility may be due to, for example, differences or variations in electrical shielding in this region 165. Different lines 125, 126 may be affected differently. An input 170 in this region 165 that is outside of the display area 110 of the touchscreen 105, and that is not intended for user input, may be falsely or incorrectly detected, identified, and/or seen by the touch controller 140 as an input 175 (or a multitude of inputs) arising from elsewhere in the display area 110. Such a falsely identified input 175 can be problematic because it may, for example, cause the apparatus 100 to perform an unintended action, display a ghost, or cause a phantom image to be displayed in the display area 110. A false input, or the false detection of an input, does not mean that an input did not actually occur. Rather, a false input or a falsely detected input can be considered an input and/or contact that is detected as arising from a different part of the touchscreen apparatus 100 than where the input actually occurred.

To detect such false or unintended inputs, the example touch controller 140 includes a false-input detect (FID) pin 180 electrically coupled to a sensor. An example sensor includes a line or trace 185, which is routed to one or more false-input sense lines (one of which is designated at reference numeral 190) on the flexible PCB 150. In some examples, the FID pin 180 is an analog input pin. Inputs received on the FID pin 180 may be, for example, signals received from an actively transmitting stylus, or a change in signal due to a capacitive or resistive property of a stylus or finger. The false-sense lines 190 are dispersed, interspersed, or otherwise located amongst the lines 125, 126 in the region 165. For example, false-sense lines 190 may be located between every N (e.g., four) lines 125, 126, as shown in FIG. 1. The spacing 195 between false-input sense lines 190 may be selected based on finger and/or stylus properties. For example, false-input sense lines 190 may be spaced so that when a stylus is midway between two lines 190, both lines 190 can sense the stylus. For instance, for an active capacitive stylus, the spacing 195 may be selected to be approximately the expected capacitive field size of 8-to-9 millimeters (mm) of the stylus. It may also be selected to accommodate a hover of a stylus above the display area 110, and/or the shape (e.g., cone) of the capacitive field. In some instances, the false-sense lines 190 do not extend into the display area 110.

When the example touch controller 140 of FIG. 1 receives an active input signal on the FID pin 180, the example touch controller 140 ignores other touch inputs as being presumably false inputs. In examples supporting multi-touch capability, the corresponding touch input in the display area 110 for the active input signal on the FID pin 180 can be ignored. The corresponding input may be determined using any number of methods, algorithms, and/or logic such as other inputs arising at the same time as the input on the FID pin 180. In some examples, the false-sense lines 190 are used to detect that a hand is holding the touchscreen apparatus 100 in the region 165. Inputs on the display area 110 adjacent to the region 165 could then be ignored as presumably associated with the hand overlapping onto the display area 110. In some examples, signals on the FID pin 180 are compared to a threshold to determine whether an input has occurred in the region 165 that may result in a falsely sensed input in the display area 110. The threshold may be selected to reduce false detection of inputs in the region 165. The threshold may be user settable, may be set based on stylus make/model, and/or may be set a time of manufacture.

Figure 2:
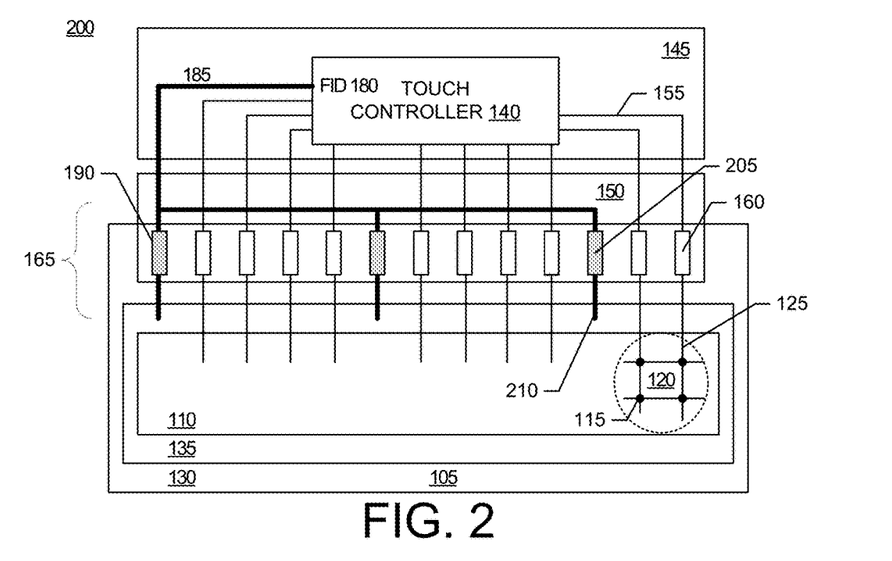
FIG. 2 is a block diagram of another example touchscreen apparatus to reduce false sensing of touchscreen inputs.

FIG. 2 is a block diagram of another example touchscreen apparatus 200 that reduces false sensing of touchscreen inputs. The example touchscreen apparatus 200 of FIG. 2 differs from the apparatus 100 of FIG. 1 in that the false-input sense lines 190 are extended onto the touchscreen 105 via corresponding bonding pads (one of which is designated at reference numeral 205) and traces or lines (one of which is designated at reference numeral 210). The extension of the lines 190 provides for addition reduction of falsely identified inputs.

Figure 3:
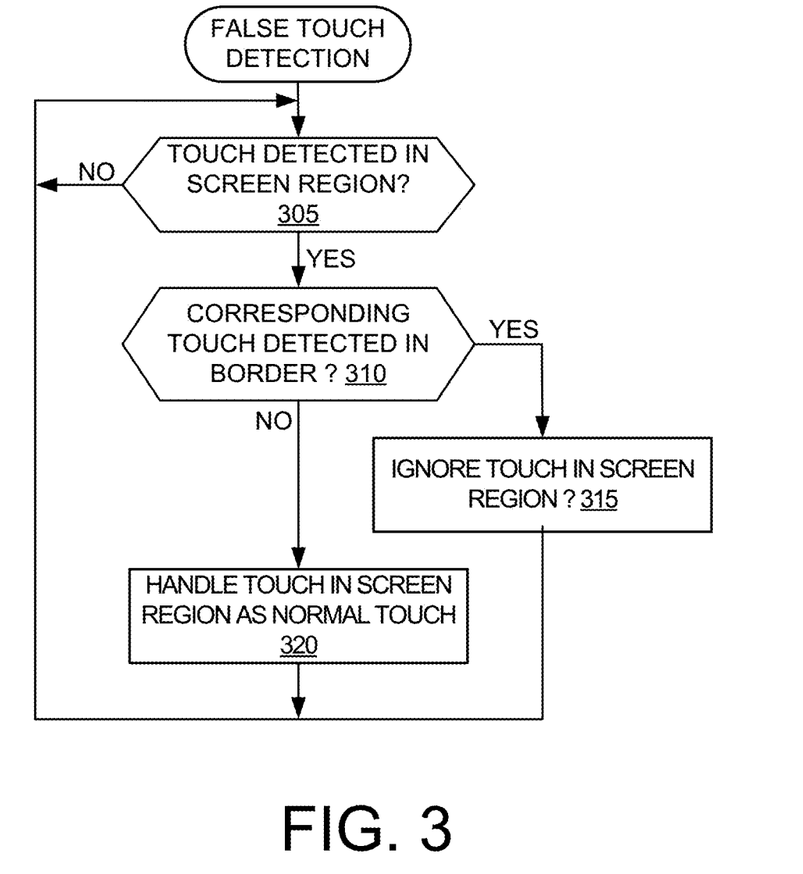
FIG. 3 is a flowchart representing an example method that may be used to reduce false sensing of touchscreen inputs.

FIG. 3 is a flowchart of an example method that may, for example, be implemented as machine-readable instructions performed by one or more processors, such as the example touch controller 140, to implement the example reducing of sensing false inputs on touchscreens disclosed herein. The example method of FIG. 3 includes the touch controller 140 waiting to detect a touch input in the display area 110 (block 305). A touch input in the display area 110 may be determined by, for example, comparing one or more of the lines 125, 126 signals to a threshold. If a corresponding touch (e.g., by time or location) occurs in the border region 165 (block 310), the touch controller 140 ignores the touch in the display area 110 (block 315) and control returns to block 305 to wait for another touch input. A touch in the border region 165 may be determined by, for example, comparing a signal at the FID pin 180 to the same or a different threshold. If there is no corresponding touch in the border region 165 (block 310), handle touch as normal touch input (block 320) and then control returns to block 305 to wait for another touch input.

One or more of the elements and interfaces disclosed herein may be duplicated, implemented in the parallel, implemented in the singular, combined, divided, re-arranged, omitted, eliminated and/or implemented in any other way. Further, any of the disclosed elements and interfaces may be implemented by a processor, a computer and/or a machine having a processor, such as the example processor platforms 400 and 450 discussed below in connection with FIG. 4. Example processors include, but are not limited to a circuit, a programmable processor, fuses, an application-specific integrated circuit (ASIC), a programmable logic device (PLD), a field-programmable logic device (FPLD), a field-programmable gate array (FPGA), a digital signal processor (DSP), a graphics processing unit (GPU), a central processing unit (CPU), a microcontroller, and/or a controller. Any of the elements and interfaces disclosed herein may, for example, be implemented as instruction, program code, and/or machine-readable instructions carried out by one or more of a processor, a computer and/or a machine having a processor. A processor, a computer and/or a machine having a processor may be used, configured and/or programmed to execute and/or carry out the examples disclosed herein. For example, any of the examples may be embodied in instructions, program code, and/or machine-readable instructions stored on a tangible and/or non-transitory computer-readable medium accessible by a processor, a computer and/or other machine having a processor, such as the example processor platforms 400 and 450 discussed below in connection with FIG. 4. Machine-readable instructions include, for example, instructions that cause a processor, a computer and/or a machine having a processor to perform one or more particular processes or methods. When a claim of this patent incorporating one or more of the elements of FIG. 1 is read to cover a purely software and/or firmware implementation, at least one of the elements of FIG. 1 is hereby expressly defined to include a tangible article of manufacture such as a tangible machine-readable medium storing machine-readable instructions such as the firmware and/or software.

The example methods disclosed herein may, for example, be implemented as instructions, program code, machine-readable instructions carried out by a processor, a computer and/or other machine having a processor. A processor, a controller and/or any other suitable processing device such as those shown in FIG. 4 may be used, configured and/or programmed to execute and/or carry out the example methods. For example, they may be embodied in instructions, program code and/or machine-readable instructions stored on a tangible and/or non-transitory computer-readable medium accessible by a processor, a computer and/or other machine having a processor, such as those discussed below in connection with FIG. 4. Many other methods of implementing the example methods may be employed. For example, the order of execution may be changed, and/or one or more of the blocks and/or interactions described may be changed, eliminated, sub-divided, or combined. Additionally, any or the entire example methods may be carried out sequentially and/or carried out in parallel by, for example, separate processing threads, processors, devices, and/or discrete logic, circuits.

As used herein, the terms "computer-readable medium" and "machine-readable medium" expressly exclude propagating signals. Example computer-readable or machine-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a FLASH drive, a floppy disk, a Synchronous Dynamic Random Access Memory (SDRAM), a Dynamic Random Access Memory (DRAM), a RAMBUS Dynamic Random Access Memory (RDRAM) a programmable ROM (PROM), an electronically-programmable ROM (EPROM), an electronically-erasable PROM (EEPROM), a solid state (SS) memory, a solid state disk (SSD), an optical storage disk, an optical storage device, a magnetic storage disk, a network-attached storage (NAS) device, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Figure 4:
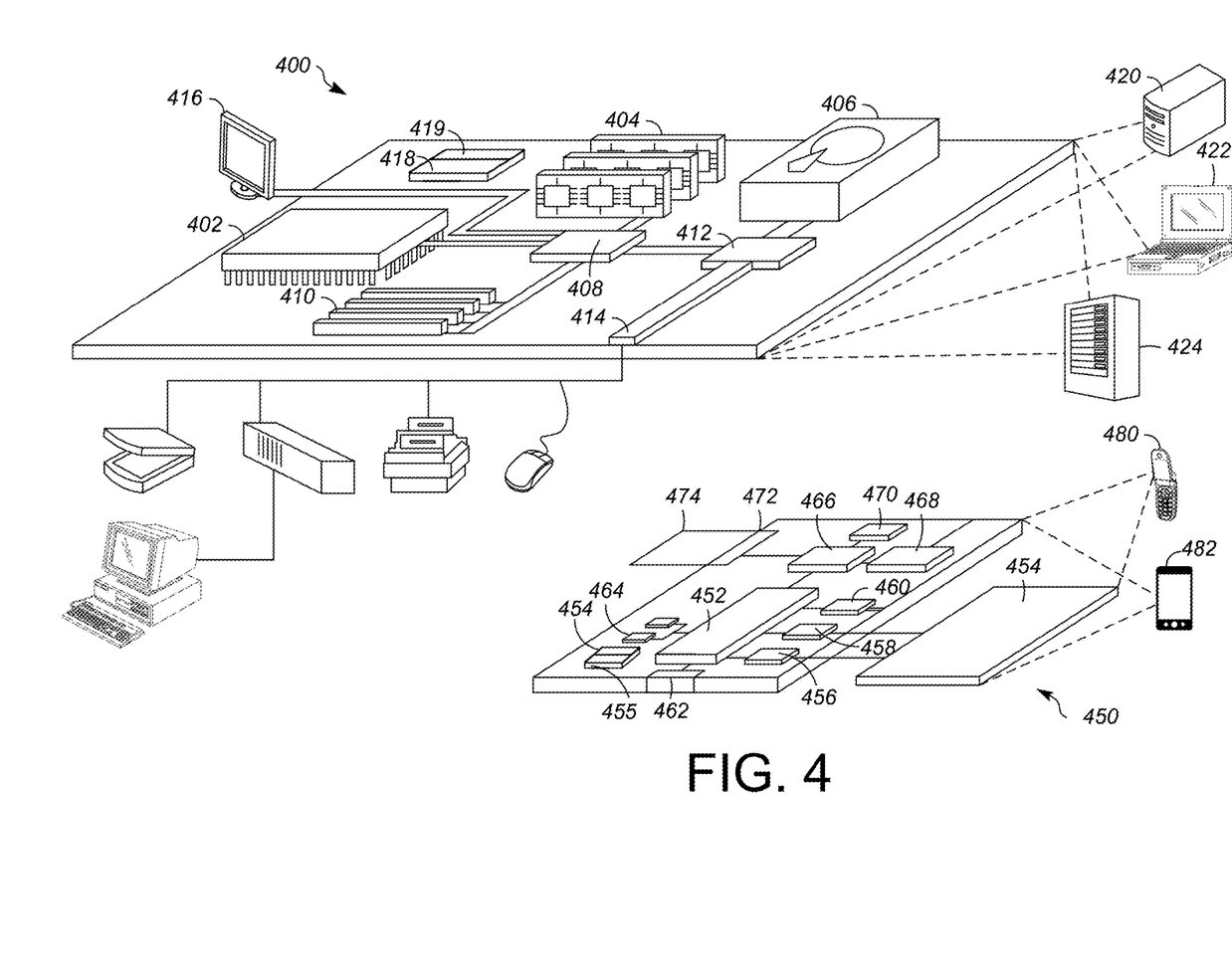
FIG. 4 is a block diagram of an example computer device and an example mobile computer device, which may be used to implement the examples disclosed herein.

FIG. 4 shows an example of a generic computing device 400 and a generic mobile computer device 450, which may be used with the techniques described here. Computing device 400 is intended to represent various forms of digital computers, such as laptops, desktops, tablets, workstations, personal digital assistants, televisions, servers, blade servers, mainframes, and other appropriate computing devices. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document. The devices 400 and 450 may be used to implement, among other things, the example touch controller 140 of FIGS. 1 and 2.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. The processor 402 can be a semiconductor-based processor. The memory 404 can be a semiconductor-based memory. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system). The example computing device 400 includes a battery 418 for powering the device 400, and a charging module 419 to charge the battery 418.

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.). The example computing device 450 includes a battery 453 for powering the device 450, and a charging module 455 (e.g., see the example module 130 of FIG. 1) to charge the battery 453.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages or music files) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Figure 5A:
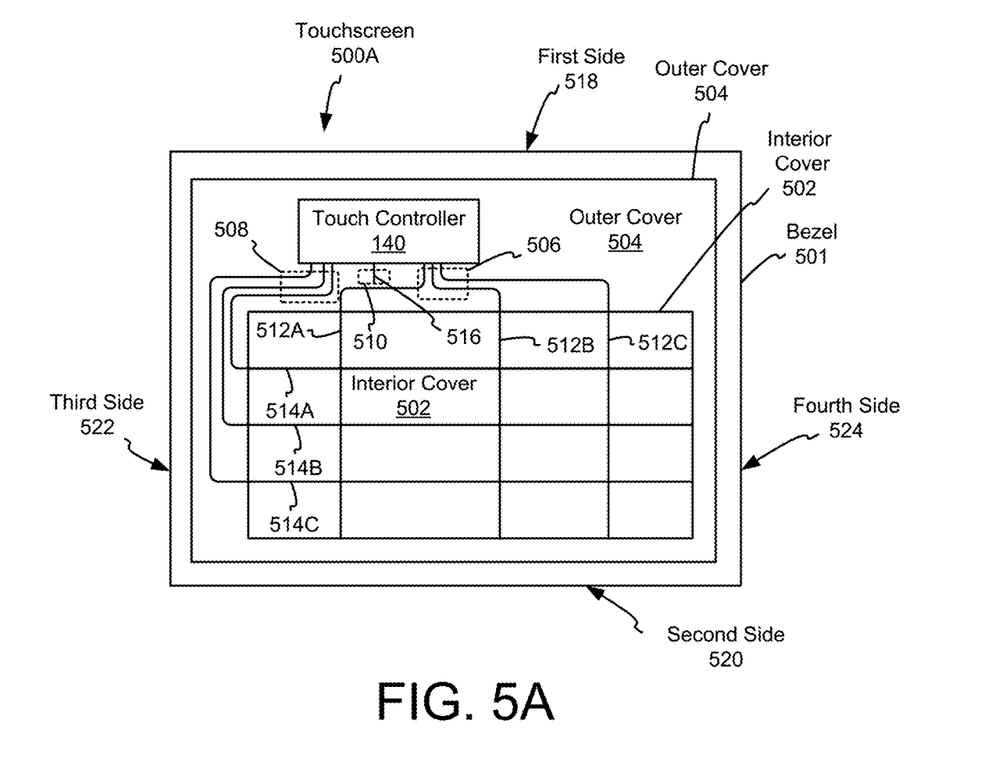
FIG. 5A is a diagram of an example touchscreen.

FIG. 5A is a diagram of an example touchscreen 500A. The touchscreen 500A, which can also be considered a display, can be included in the computing device 400 and/or mobile computing device 450 described above with respect to FIG. 4. The touchscreen 500A can include any combination of the features and/or components described above with respect to the touchscreen apparatuses 100, 200 and/or touchscreen 105.

The touchscreen 500A can be rectangular, have a rectangular shape, and/or be rectangular-shaped, forming a rectangular-shaped display. The touchscreen 500A can include a rectangular and/or rectangular-shaped bezel 501, a rectangular and/or rectangular-shaped opaque outer cover 504 (and/or outer cover portion) surrounded by the bezel 501, and/or a rectangular and/or rectangular-shaped translucent interior cover 502 (and/or interior cover portion) surrounded by the opaque outer cover 504. The interior cover 502 and outer cover 504 may be made of a single sheet of glass or other transparent and/or translucent, insulative and/or nonconductive material. The interior cover 502 may be translucent, allowing visible light to pass through, to enable presenting graphical content, may be intended to receive touch input, and/or may be considered an active part of the display. The outer cover 504 may be opaque, preventing visible light from passing through, not intended to present graphical content, and may not be intended to receive touch input. The bezel 501, outer cover 504, and/or interior cover 502 can each include a first side 518, a second side 520 opposing and/or opposite from the first side 518, a third side 522 adjacent to both the first side 518 and second side 520, and a fourth side 524 opposing and/or opposite from the third side 522 and adjacent to both the first side 518 and the second side 520.

Touch electrodes 512A, 512B, 512C, 514A, 514B, 514C may be routed from the touch controller 140 through the outer cover 504 and a flexible printed circuit board (PCB) to locations at which the electrodes 512A, 512B, 512C, 514A, 514B, 514C extend below the interior cover 502. The touchscreen 500A can include a first plurality of electrodes 512A, 512B, 512C that are parallel to each other and extend in a first direction, such as from the first side 518 to the second side 520. While three electrodes 512A, 512B, 512C are shown in FIG. 5A for ease of illustration, many more than three electrodes 512A, 512B, 512C can be included in the first plurality of electrodes. The touchscreen 500A can also include a second plurality of electrodes 514A, 514B, 514C that are parallel to each other, are perpendicular to the first plurality of electrodes, and extend in a second direction, such as from the third side 522 to the fourth side 524. The second plurality of electrodes 514A, 514B, 514C can intersect the first plurality of electrodes 512A, 512B, 512C. While three electrodes 512A, 512B, 512C are shown in FIG. 5A for ease of illustration, many more than three electrodes 512A, 512B, 512C can be included in the first plurality of electrodes. The electrodes 512A, 512B, 512C, 514A, 514B, 514C can include capacitive sensors that detect changes in capacitance caused by proximity of conductive materials such as a user's finger and send signals to the touch controller indicating the change in capacitance. The electrodes 512A, 512B, 512C, 514A, 514B, 514C can include any combination of features of the lines 125, 126 described above.

The touch controller 140 can include any features of the touch controller described above with respect to FIGS. 1, 2, and 3, and can determine a location of a contact on the touchscreen 500A and/or display based on which electrodes 512A, 512B, 512C, 514A, 514B, 514C detect the contact and/or receive input. For example, if the electrode 512B detects a contact and the electrode 514B detects a contact, then the touch controller 140 can determine that the contact occurred at or near the intersection of the electrodes 512B, 514B. However, if a contact occurs between portions 506, 508 where the electrodes 512A, 512B, 512C, 514A, 514B, 514C extend from the touch controller 140 and/or flexible PCB, then, for example, both of the electrodes 512A, 514A could detect the contact and the touch controller 140 could falsely determine that a contact occurred at the intersection of the electrodes 512A, 514A.

The touch controller 140 can include a processor configured to execute instructions to cause the touchscreen 500A to perform any combination of methods, functions, and/or techniques described herein. The touch controller 140 can include at least one memory device comprising a non-transitory computer-readable storage medium comprising instructions stored thereon that, when executed by the processor and/or touch controller 140, cause the touchscreen 500A to perform any combination of methods, functions, and/or techniques described herein.

Figure 7:
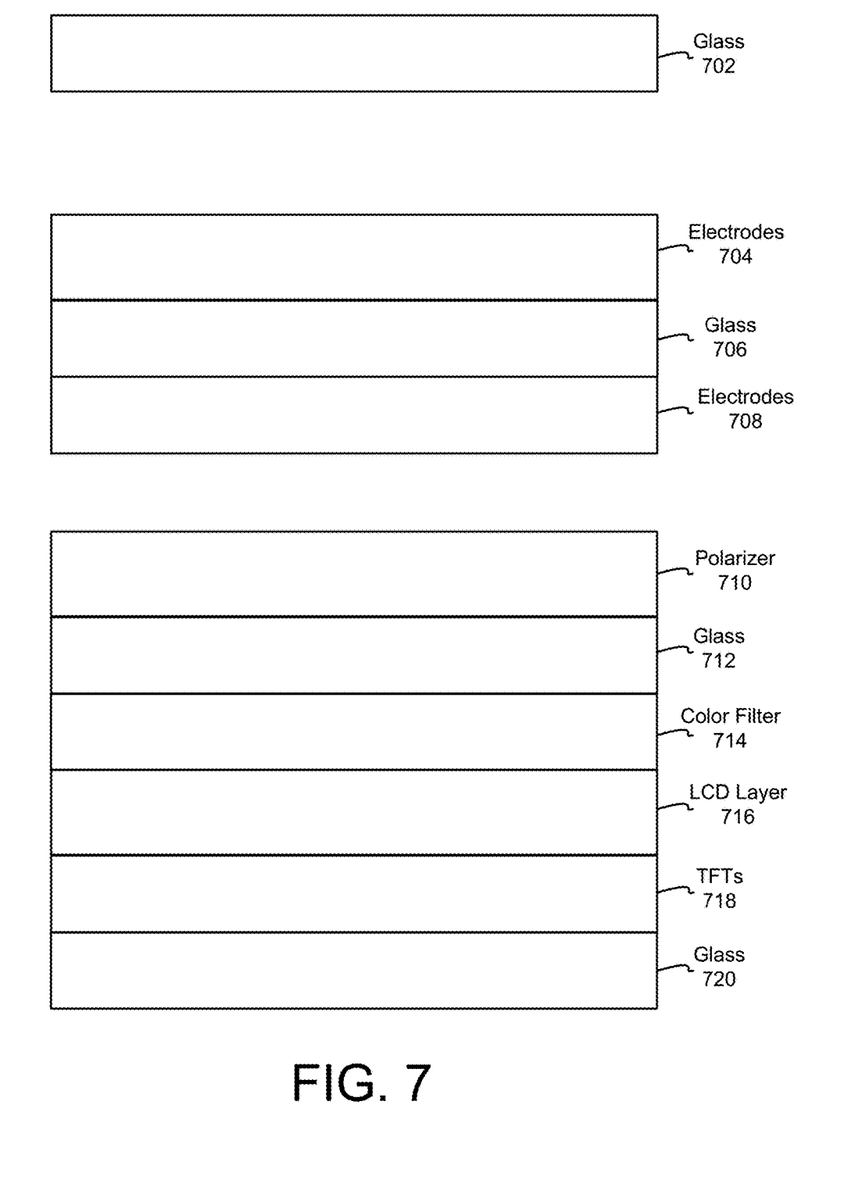
FIG. 7 is a diagram showing layers of a touchscreen according to an example embodiment.

In the example shown in FIG. 5A, the first plurality of electrodes 512A, 512B, 512C extends under a first portion 506 of the opaque outer cover portion 504, adjacent to the touch controller 140 and/or flexible PCB and on the first side 518 of the opaque outer cover 504, and under the translucent interior cover portion 502 from the first side 518 of the translucent interior cover 502 toward the second side 520 of the translucent interior cover 502. The second plurality of electrodes 514A, 514B, 514C extends under a second portion 508 of the opaque outer cover portion 504, also adjacent to the touch controller 140 and/or flexible PCB and on the first side 518 of the opaque outer cover 504, under the third side 522 of the opaque outer cover 504, and under the translucent interior cover portion 502 from the third side 522 of the translucent interior cover 502 toward the fourth side 524 of the translucent interior cover 502. The second portion 508 can be non-overlapping with the first portion 506. The second plurality of electrodes 514A, 514B, 514C intersects the first plurality of electrodes 512A, 512B, 512C. In some examples, an insulative layer, such as glass, may separate the first plurality of electrodes 512A, 512B, 512C from the second plurality of electrodes 514A, 514B, 514C, as shown in FIG. 7, preventing the first plurality of electrodes 512A, 512B, 512C from contacting the second plurality of electrodes 514A, 514B, 514C.

The touchscreen 500A can include a dummy electrode 516 under a third portion 510 of the opaque outer cover 504. The dummy electrode 516 can include any combination of the false-sense lines 190 described above. The third portion 510 can be non-overlapping with the first portion 506 and second portion 508. The dummy electrode 516 can cause the touch controller 140 and/or touchscreen 500A to not recognize and/or ignore a contact when the dummy electrode 516 recognizes a contact, preventing recognition of false inputs. The dummy electrode 516 can include a capacitive sensor that detects changes in capacitance caused by proximity of conductive materials, such as a user's finger, and sends signals to the touch controller 140 indicating the change in capacitance.

The third portion 510 of the outer cover 504, under which the dummy electrode 516 is disposed, can be disposed between the first portion 506 of the outer cover 504 and the second portion 508 of the outer cover 504. The third portion 510 can be non-overlapping with the first portion 506 and the second portion 508. The location of the dummy electrode 516 between the first plurality of electrodes 512A, 512B, 512C and the second plurality of electrodes 514A, 514B, 514C, and under the opaque outer cover 504, can cause the dummy electrode 516 to detect a contact when the contact would be detected by at least one of the first plurality of electrodes 512A, 512B, 512C and at least one of the second plurality of electrodes 514A, 514B, 514C, even though the contact is on the opaque outer cover 504 where the touchscreen 500A is not designed to recognize or process contacts.

In some examples, the dummy electrode 516 extends only under the opaque outer cover 504, and/or does not extend under any portion of the translucent interior cover 502. The extension of the dummy electrode 516 under only the opaque outer cover 504, and/or the dummy electrode 516 not extending under any portion of the translucent interior cover 502, can cause the dummy electrode 516 to detect contacts, and/or prevent recognition of false inputs, only for contacts that contact the outer cover 504, where the touchscreen 500A should not recognize contacts, and not for contacts that contact the interior cover 502, where the touchscreen 500A should recognize contacts.

In some examples, the dummy electrode 516 can have a lower threshold for recognizing and/or detecting a contact than any of the electrodes 512A, 512B, 512C, 514A, 514B, 514C. In some examples, the threshold for the dummy electrode 516 and/or electrodes 512A, 512B, 512C, 514A, 514B, 514C recognizing and/or detecting a contact can be measured in changes in capacitance and/or resistance. The lower threshold can cause the dummy electrode 516 to recognize, process, and/or detect the contact as a false input before any of the electrodes 512A, 512B, 512C, 514A, 514B, 514C recognize, process, and/or detect the contact, so that the touch controller 140 can stop recognizing contacts before any of the electrodes 512A, 512B, 512C, 514A, 514B, 514C detects the contact. The lower threshold for the dummy electrode 516 can also be beneficial because the electrodes 512A, 512B, 512C, 514A, 514B, 514C are longer than the dummy electrode 516, which could otherwise cause the electrodes 512A, 512B, 512C, 514A, 514B, 514C to detect the contact before the dummy electrode 516 detects the contact if the dummy electrode 516 had the same threshold as the electrodes 512A, 512B, 512C, 514A, 514B, 514C, which could cause the touch controller 140 to briefly recognize and/or process a contact based on detection of the contact by the electrodes 512A, 512B, 512C, 514A, 514B, 514C before ceasing to recognize or process, and/or before ignoring, the contact based on detection of the contact by the dummy electrode 516.

Figure 5B:
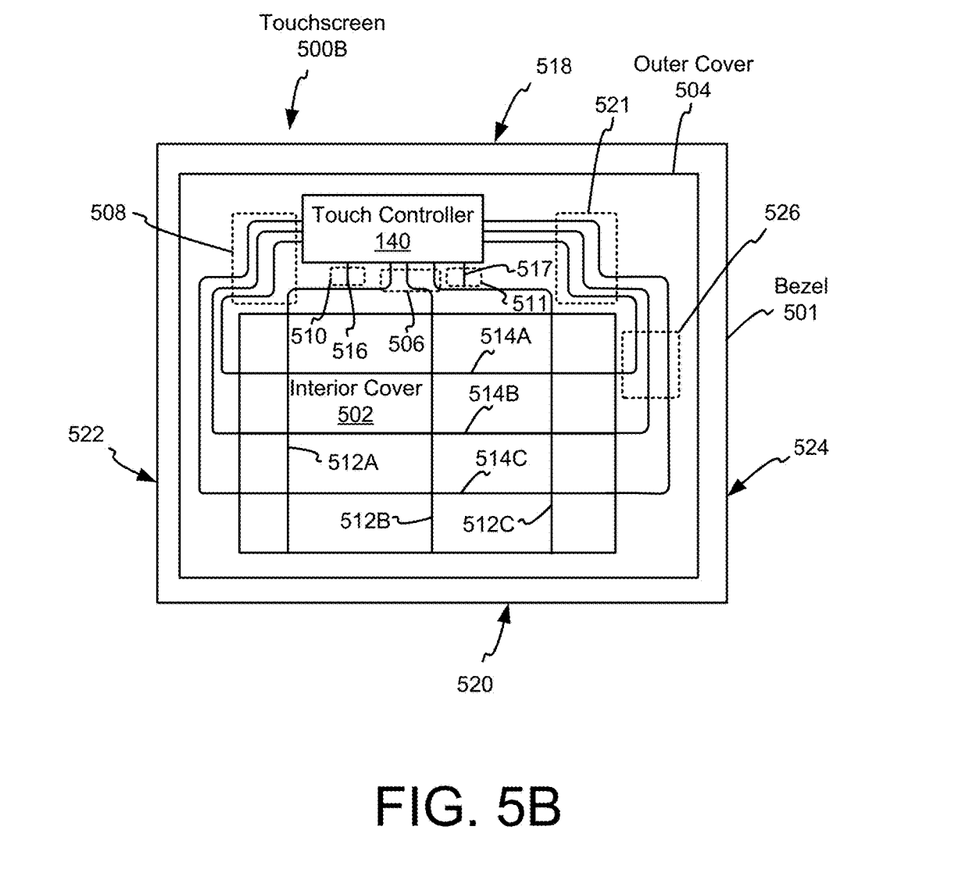
FIG. 5B is a diagram of another example touchscreen.

FIG. 5B is a diagram of another example touchscreen 500B. The touchscreen 500B can include features and/or components of the touchscreen 500A, as described above.

In this example, the second plurality of electrodes 514A, 514B, 514C extends from the fourth side 514 to and/or through a fourth portion 521 of the opaque outer cover portion 504 to the touch controller 140. The fourth portion 521 can be non-overlapping with the first portion 506, second portion 508, and third portion 510. The fourth portion 521 can be on a same side, and/or the first side 518, of the touchscreen 500B, as the first portion 506 and second portion 508. The fourth portion 521 can be on an opposite side of the first portion 506 as the second portion 508, and/or on an opposite side of the touch controller 140 as the second portion 508. The second plurality of electrodes 514A, 514B, 514C can extend from the second portion 508, under the third side 522 of the outer cover 504, under the interior cover 502, under a fifth portion 526 of the outer cover 504, under the fourth portion 521, to the touch controller 140. The fifth portion 526 can be on the fourth side 524 of the outer cover 504 and non-overlapping with the first portion 506, second portion 508, third portion 510, and fourth portion 521.

In the example shown in FIG. 5B, the touchscreen 500B includes another dummy electrode 517. The dummy electrodes 516, 517 can be coupled to a common node, such as the false-input detector 180 and/or trace 185 described above with respect to FIGS. 1 and 2, either inside or outside the touch controller 140, so that contacting any of the dummy electrodes 516, 517 prevents recognition of false input. The dummy electrode 517 can have similar features as the dummy electrode 516. The dummy electrode 517 is disposed under a sixth portion 511 of the opaque outer cover portion 504. The sixth portion 511 is disposed between the first portion 506 and the fourth portion 521, and can be non-overlapping with the first portion 506, second portion 508, third portion 510, fourth portion 521, and fifth portion 526. In this example, the touch controller 140 can recognize and/or process a contact based on at least one of the first plurality of electrodes 512A, 512B, 512C receiving and/or detecting input and/or contact and at least one of the second plurality of electrodes 514A, 514B, 514C receiving and/or detecting input and/or contact, and neither of the dummy electrodes 516, 517 receiving and/or detecting input and/or contact. The touch controller 140 can not recognize, and/or can ignore, a contact based on either of, and/or at least one of, the dummy electrode 516 and/or the dummy electrode 517 receiving and/or detecting a contact, even if any combination of the electrodes 512A, 512B, 512C, 514A, 514B, 514C receives and/or recognizes a contact.

Figure 6:
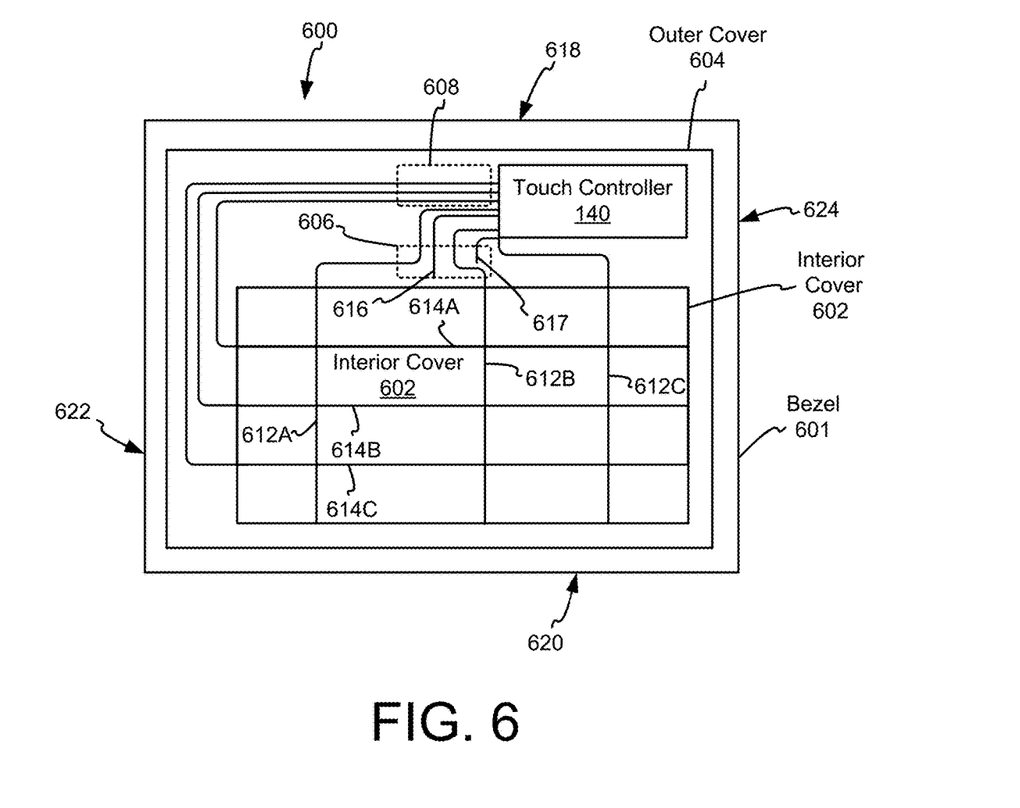
FIG. 6 is a diagram of another example touchscreen.

FIG. 6 is a diagram of another example touchscreen 600. The touchscreen 600 can include any combination of components and/or features described above with respect to the touchscreen 500A, 500B of FIGS. 5A and 5B.

In this example, a dummy electrode 606 is disposed under a first portion 606 of the opaque outer cover 604 and between two electrodes 612A, 612B. The dummy electrode 606 can have similar features and/or properties as the dummy electrode 516 described above with respect to FIGS. 5A and 5B. The first portion 606 can be proximal to a location from which a first plurality of electrodes 612A, 612B, 612B extend from the touch controller 140. The first plurality of electrodes 612A, 612B, 612C can have similar features and/or properties to the first plurality of electrodes 512A, 512B, 512C described above with respect to FIGS. 5A and 5B. The first portion 606 can be proximal to, and/or non-overlapping with, a second portion 608 of the opaque outer cover 604. The second portion 608 can be proximal to a location from which a second plurality of electrodes 614A, 614B, 614C extends from the touch controller 140 and/or flexible PCB. The second plurality of electrodes 614A, 614B, 614C can have similar features and/or properties as the second plurality of electrodes 514A, 514B, 514C described above with respect to FIGS. 5A and 5B. The dummy electrode 616 can prevent contacts on the first side 618 of the outer cover 604, which could be detected by electrodes in both the first plurality of electrodes 612A, 612B, 612C and the second plurality of electrodes 614A, 614B, 614C, from being recognized as contacts by the touch controller 140.

The touchscreen 600 can include one or more additional, such as a second dummy electrode 617, disposed between other electrodes, such as between the electrodes 612B, 612C, and under the first portion 606. In some examples, the touchscreen 600 includes dummy electrodes 616, 617 between every N electrodes 612A, 612B, 612C. The additional electrodes can prevent contacts on the first side 618 of the outer cover 604, which could be detected by electrodes in both the first plurality of electrodes 612A, 612B, 612C and the second plurality of electrodes 614A, 614B, 614C, from being recognized as contacts by the touch controller 140. The dummy electrodes 616, 617 can be coupled to a common node, either inside or outside the touch controller 140 and/or flexible PCB, so that contacting any of the dummy electrodes prevents recognition of false input.

FIG. 7 is a diagram showing layers of a touchscreen according to an example embodiment. These layers may be included in any of the touchscreens 100, 200, 500A, 500B, 600 described above.

The touchscreen can include a glass layer 702. The glass layer 702 can be located at a top of the touchscreen for contact by the user's finger. The glass layer 702 can include both the translucent interior cover portion 502, 602 and the opaque outer cover portion 504, 604.

The touchscreen can include a glass layer 706 with electrodes 704, 708 on opposite sides of the glass layer 706. In some examples, the electrodes 704 can include either the electrodes 512A, 512B, 512C, 612A, 612B, 612C or the electrodes 514A, 514B, 514C, 612A, 612B, 612C, and the electrodes 708 can include the other electrodes 514A, 514B, 514C, 614A, 614B, 614C or 512A, 512B, 512C, 612A, 612B, 612C. For example, if the electrodes 704 includes either the electrodes 512A, 512B, 512C or 612A, 612B, 612C, then the electrodes 708 can include either the electrodes 514A, 514B, 514C or 614A, 614B, 614C. In another example, if the electrodes 704 includes either the electrodes 514A, 514B, 514C or 614A, 614B, 614C, then the electrodes 708 can include electrodes 512A, 512B, 512C or 612A, 612B, 612C. The inclusion of electrodes 704, 708 extending in opposite directions on opposite sides of the glass layer 706 enables the glass layer 706 to act as an insulator between the electrodes 704, 708 in a vertical direction, so that while the electrodes 704, 708 intersect in a horizontal direction, as shown in FIGS. 5A, 5B, and 6, the electrodes 704, 708 in each of the first and second pluralities do not contact and/or are not electrically coupled to the electrodes 704, 708 in the other plurality. Either of the electrodes 704, 708 can also include any of the dummy electrodes 516, 517, 616, 617.

The touchscreen can include a polarizing layer 710 covering a glass layer 712. The polarizing layer 710 can be an optical filter that lets light waves of specific polarizations pass, and blocks light waves of other polarizations, controlling the output of the touchscreen.

A color filter 714 can cover a side of the glass layer 712 that is opposite from the polarizing layer 710. A liquid crystal display (LCD) layer 716 adjacent to the color filter 714 can include liquid crystals that modulate light. A thin-film transistor (TFT) layer on an opposite side of the LCD layer 716 from the color filter 714 can control light emitted by individual pixels. A glass layer 720 on an opposite side of the TFT layer 718 can seal and/or protect the color filter 714, LCD layer 716, and TFT layer 718.

Figure 8:
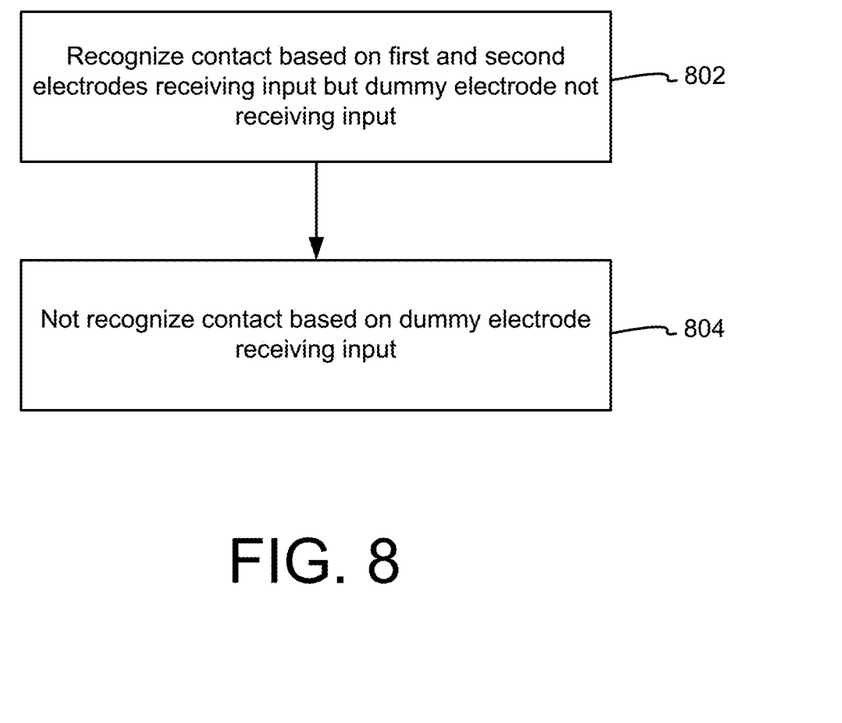
FIG. 8 is a flowchart showing an example method.

FIG. 8 is a flowchart showing an example method. The method can be performed by any of the touchscreens 100, 200, 500A, 500B, 600 and/or computing devices 400, 450 described above. The method can include the touchscreen 100, 200, 500A, 500B, 600 and/or computing device 400, 450 processing a contact in response to receiving input on at least one of a first plurality of electrodes 512A, 512B, 512C, 612A, 612B, 612C receiving input and at least one of a second plurality of electrodes 514A, 514B, 514C, 614A, 614B, 614C and receiving no input on a dummy electrode 516, 517, 616, 617 (802). The first plurality of electrodes 512A, 512B, 512C, 612A, 612B, 612C can intersect the second plurality of electrodes 514A, 514B, 514C, 614A, 614B, 614C in a horizontal plane, but not in a vertical plane. The dummy electrode(s) 516, 517, 616, 617 can be adjacent to the first plurality of electrodes 512A, 512B, 512C, 612A, 612B, 612C. The method can also include ignoring a contact in response to receiving input on the dummy electrode 516, 517, 616, 617, at least one of the first plurality of electrodes 512A, 512B, 512C, 612A, 612B, 612C, and at least one of the second plurality of electrodes 514A, 514B, 514C, 614A, 614B, 614C.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately or generally are used herein to indicate that a precise value or range thereof is not required and need not be specified. As used herein, the terms discussed above will have ready and instant meaning to one of ordinary skill in the art.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

The invention claimed is:

1. An apparatus comprising:
   a display comprising a translucent interior cover portion and an opaque outer cover portion;
   a first plurality of electrodes extending under a first portion of the opaque outer cover portion and under the translucent interior cover portion;
   a second plurality of electrodes extending under a second portion of the opaque outer cover portion and under the translucent interior cover portion, the second portion of the opaque outer cover portion being non-overlapping with the first portion of the opaque outer cover portion, the second plurality of electrodes intersecting the first plurality of electrodes under the translucent interior cover portion;
   a dummy electrode under a third portion of the opaque outer cover portion, the third portion of the opaque outer cover portion being disposed between the first portion of the opaque outer cover portion and the second portion of the opaque outer cover portion; and
   a processor configured to cause the apparatus to:
      process a contact in response to receiving input on at least one of the first plurality of electrodes and receiving input on at least one of the second plurality of electrodes and receiving no input on the dummy electrode; and
      ignore a contact in response to receiving input on the dummy electrode, at least one of the first plurality of electrodes, and at least one of the second plurality of electrodes.

2. The apparatus of claim 1, wherein the first plurality of electrodes comprises capacitive sensors.

3. The apparatus of claim 1, wherein the dummy electrode has a lower threshold for detecting input than the first plurality of electrodes.

4. The apparatus of claim 1, wherein the dummy electrode does not extend under the translucent interior cover portion.

5. The apparatus of claim 1, wherein:
   the display is rectangular-shaped; and
   the first portion of the opaque outer cover portion is on a same side of the rectangular-shaped display as the second portion of the opaque outer cover portion.

6. The apparatus of claim 5, wherein:
   the first plurality of electrodes extends from a first side of the rectangular-shaped display toward a second side of the rectangular-shaped display, the second side of the rectangular-shaped display being opposite from and parallel to the first side of the rectangular-shaped display; and
   the second plurality of electrodes extends from the first side of the opaque outer cover portion to a third side of the rectangular-shaped display and from the third side of the rectangular-shaped display toward a fourth side of the rectangular-shaped display, the fourth side of the rectangular-shaped display being opposite from and parallel to the third side of the rectangular-shaped display, the third side of the rectangular-shaped display being adjacent to and perpendicular to the first side of the rectangular-shaped display.

7. The apparatus of claim 6, wherein the second plurality of electrodes extends from the fourth side of the rectangular-shaped display to a fourth portion of the opaque outer cover portion, the fourth portion of the opaque outer cover portion being on the same side of the rectangular-shaped display as the first portion of the opaque outer cover portion and the second portion of the opaque outer cover portion, the fourth portion of the opaque outer cover portion being on an opposite side of the first portion of the opaque outer cover portion as the second portion of the opaque outer cover portion.

8. The apparatus of claim 7, wherein the second plurality of electrodes extends from the second portion of the opaque outer cover portion to the fourth portion of the opaque outer cover portion via a fifth portion of the opaque outer cover portion, the fifth portion of the opaque outer cover portion being on the fourth side of the opaque outer cover portion.

9. The apparatus of claim 8, wherein:
   the dummy electrode comprises a first dummy electrode,
   the apparatus further comprises a second dummy electrode disposed under a sixth portion of the opaque outer cover portion, the sixth portion of the opaque outer cover portion being disposed between the first portion of the opaque outer cover portion and the fourth portion of the opaque outer cover portion, and the processor is configured to cause the apparatus to:
recognize a contact based on at least one of the first plurality of electrodes receiving input and at least one of the second plurality of electrodes receiving input but the first dummy electrode not receiving input and the second dummy electrode not receiving input; and ignore a contact based on at least one of the first dummy electrode receiving input or the second dummy electrode receiving input even if input is received by the first plurality of electrodes and the second plurality of electrodes.

10. The apparatus of claim 9, wherein the first dummy electrode and the second dummy electrode are coupled to each other via a common node.

11. The apparatus of claim 1, wherein the processor is further configured to determine a location of the contact on the display based on which of the first plurality of electrodes received input and which of the second plurality of electrodes received input.

12. An apparatus comprising:
a display comprising a translucent interior cover portion and an opaque outer cover portion;
a first plurality of electrodes extending under a first portion of the opaque outer cover portion and under the translucent interior cover portion;
a second plurality of electrodes extending under a second portion of the opaque outer cover portion and under the translucent interior cover portion, the second portion of the opaque outer cover portion being non-overlapping with the first portion of the opaque outer cover portion, the second plurality of electrodes intersecting the first plurality of electrodes under the translucent interior cover portion;
a dummy electrode between two of the first plurality of electrodes; and
a processor configured to cause the apparatus to:
recognize a contact in response to receiving input on at least one of the first plurality of electrodes, receiving input on at least one of the second plurality of electrodes, and receiving no input on the dummy electrode; and
ignore a contact in response to receiving input on the dummy electrode, at least one of the first plurality of electrodes, and at least one of the second plurality of electrodes.

13. The apparatus of claim 12, wherein:
the display is rectangular-shaped; and
the first portion of the opaque outer cover portion is on a same side of the rectangular-shaped display as the second portion of the opaque outer cover portion.

14. The apparatus of claim 13, wherein:
the first plurality of electrodes extends from a first side of the rectangular-shaped display toward a second side of the rectangular-shaped display, the second side of the rectangular-shaped display being opposite from and parallel to the first side of the rectangular-shaped display; and the second plurality of electrodes extends from the first side of the opaque outer cover portion to a third side of the rectangular-shaped display and from the third side of the rectangular-shaped display toward a fourth side of the rectangular-shaped display, the fourth side of the rectangular-shaped display being opposite from and parallel to the third side of the rectangular-shaped display, the third side of the rectangular-shaped display being adjacent to and perpendicular to the first side of the rectangular-shaped display.

15. The apparatus of claim 14, wherein the second plurality of electrodes extends from the fourth side of the rectangular-shaped display to a fourth portion of the opaque outer cover portion, the fourth portion of the opaque outer cover portion being on the same side of the rectangular-shaped display as the first portion of the opaque outer cover portion and the second portion of the opaque outer cover portion, the fourth portion of the opaque outer cover portion being on an opposite side of the first portion of the opaque outer cover portion as the second portion of the opaque outer cover portion.

16. The apparatus of claim 15, wherein the second plurality of electrodes extends from the second portion of the opaque outer cover portion to the fourth portion of the opaque outer cover portion via a fifth portion of the opaque outer cover portion, the fifth portion of the opaque outer cover portion being on the fourth side of the opaque outer cover portion.

17. The apparatus of claim 12, wherein the first plurality of electrodes comprises capacitive sensors.

18. The apparatus of claim 12, wherein the dummy electrode has a lower threshold for detecting input than the first plurality of electrodes.

19. The apparatus of claim 12, wherein the dummy electrode does not extend under the translucent interior cover portion.

20. A non-transitory computer-readable storage medium comprising instructions stored thereon for determining whether contacts are in an active part of a display, the instructions, when executed by at least one processor, being configured to cause a computing system to:
process a contact in response to receiving input on at least one of a first plurality of electrodes and at least one of a second plurality of electrodes and receiving no input on a dummy electrode, the first plurality of electrodes intersecting the second plurality of electrodes and the dummy electrode being adjacent to the first plurality of electrodes; and
ignore a contact in response to receiving input on the dummy electrode, at least one of the first plurality of electrodes, and at least one of the second plurality of electrodes.

* * * * *